United States Patent [19]

Ellis et al.

[11] Patent Number: 4,969,792
[45] Date of Patent: Nov. 13, 1990

[54] TRUCK SUPPORTING DEVICE

[75] Inventors: Elwood B. Ellis, Indian River; Arthur S. Ellis, Brampton, both of Canada

[73] Assignee: Kelley Company Inc., Milwaukee, Wis.

[21] Appl. No.: 239,558

[22] Filed: Sep. 1, 1988

[51] Int. Cl.$^5$ ............................................. B65G 67/00
[52] U.S. Cl. ................................... 414/401; 414/396; 188/32; 410/30
[58] Field of Search ...................... 414/401, 396, 384; 188/32, 62; 410/30, 49, 62

[56] References Cited

U.S. PATENT DOCUMENTS

| | | | |
|---|---|---|---|
| 3,077,247 | 2/1963 | West et al. ......................... | 188/32 X |
| 3,221,907 | 12/1965 | O'Sullivan ......................... | 188/32 X |
| 4,102,273 | 7/1978 | Merkle et al. ..................... | 414/401 X |
| 4,207,019 | 6/1980 | Cone ................................. | 188/32 X |
| 4,572,080 | 2/1986 | Williams et al. .................. | 188/32 X |
| 4,668,140 | 5/1987 | Blunden ............................. | 410/30 X |
| 4,674,929 | 6/1987 | Blunden ............................. | 410/30 |

FOREIGN PATENT DOCUMENTS

| | | | |
|---|---|---|---|
| 0221664 | 9/1957 | Australia ........................... | 188/32 |
| 0640950 | 1/1979 | U.S.S.R. ............................ | 188/32 |
| 0918333 | 2/1963 | United Kingdom ................ | 410/30 |

Primary Examiner—H. Grant Skaggs
Assistant Examiner—James R. Bidwell
Attorney, Agent, or Firm—Andrus, Sceales, Starke & Sawall

[57] ABSTRACT

An assembly for a truck at a loading bay includes a guide track and a chock member for the truck which is reciprocated along the guide track to engage the rear wheels of the truck and lock it securely in position; the guide track may be formed in a platform forming part of the assembly and on which the truck is supported; suitably the platform is hinged at its outer end whereby the platform is pivotable about the outer end such that the rear of the truck may be elevated or lowered for alignment with the loading bay.

16 Claims, 5 Drawing Sheets

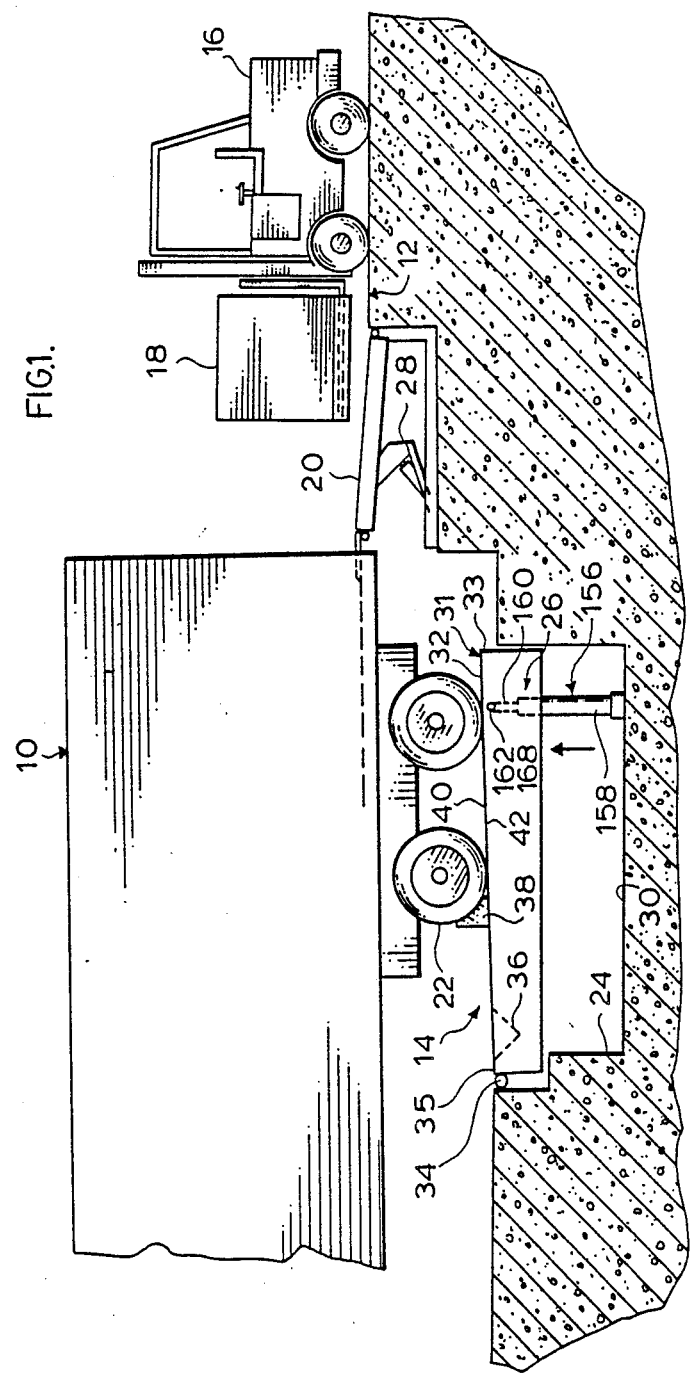

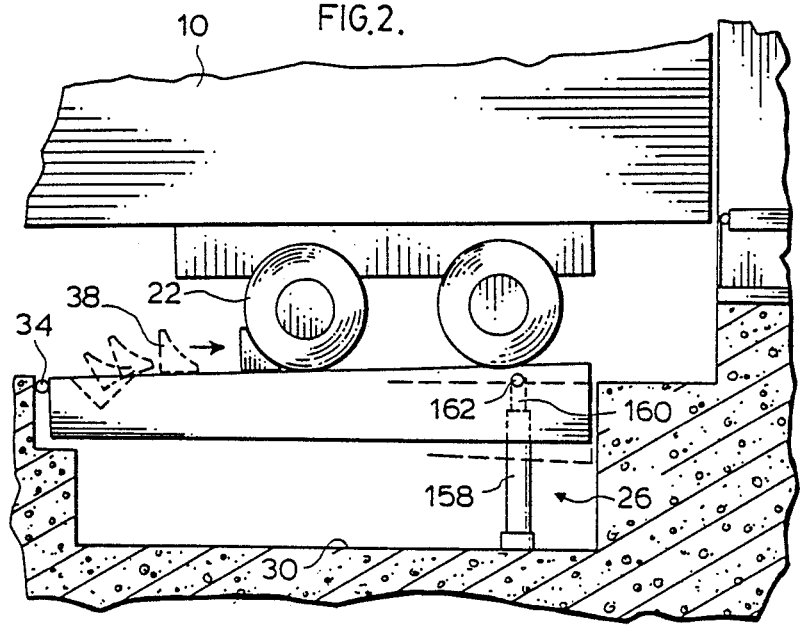
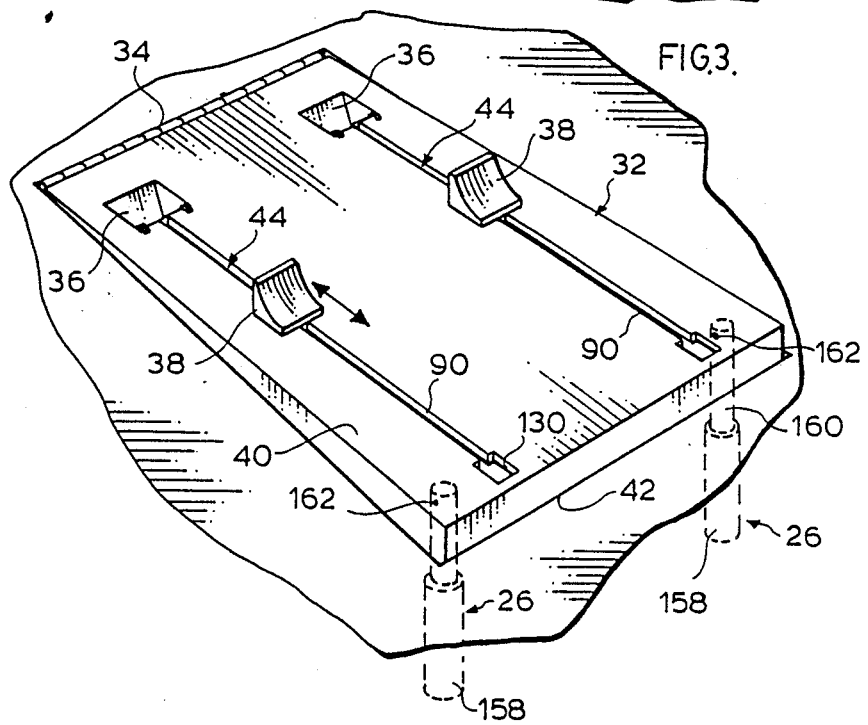

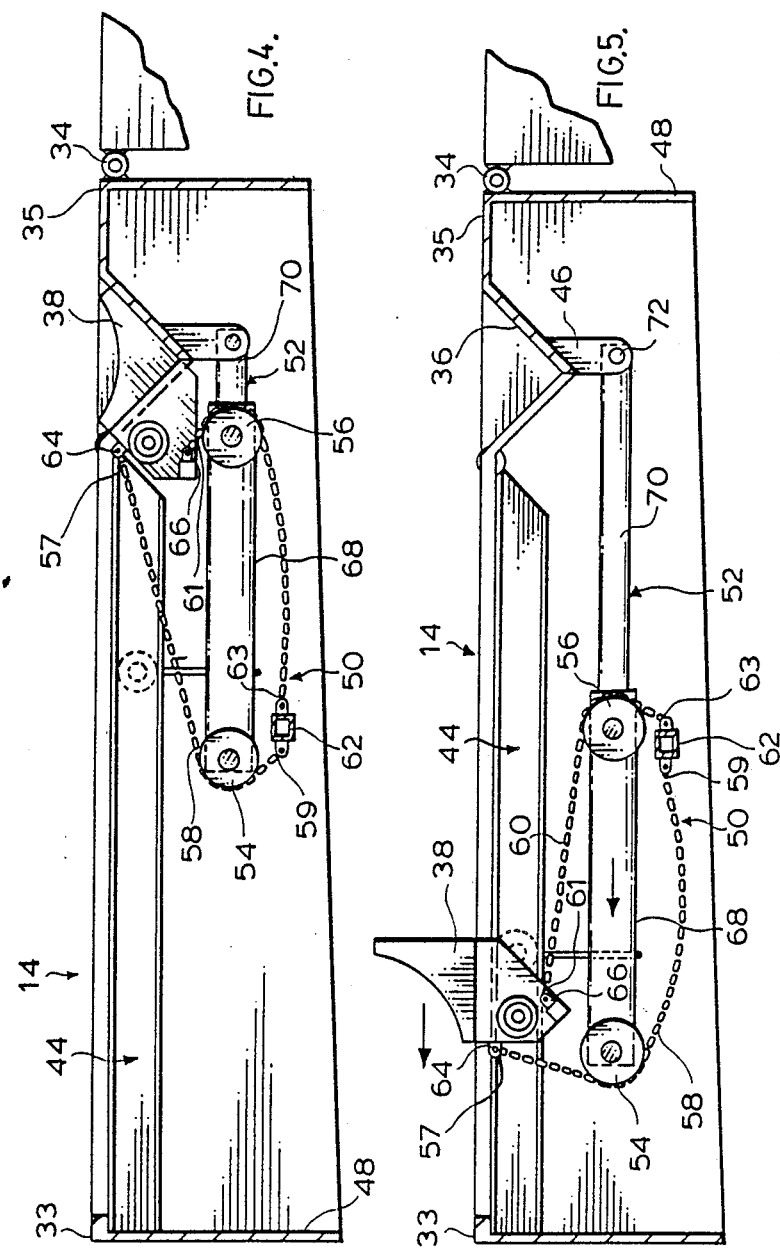

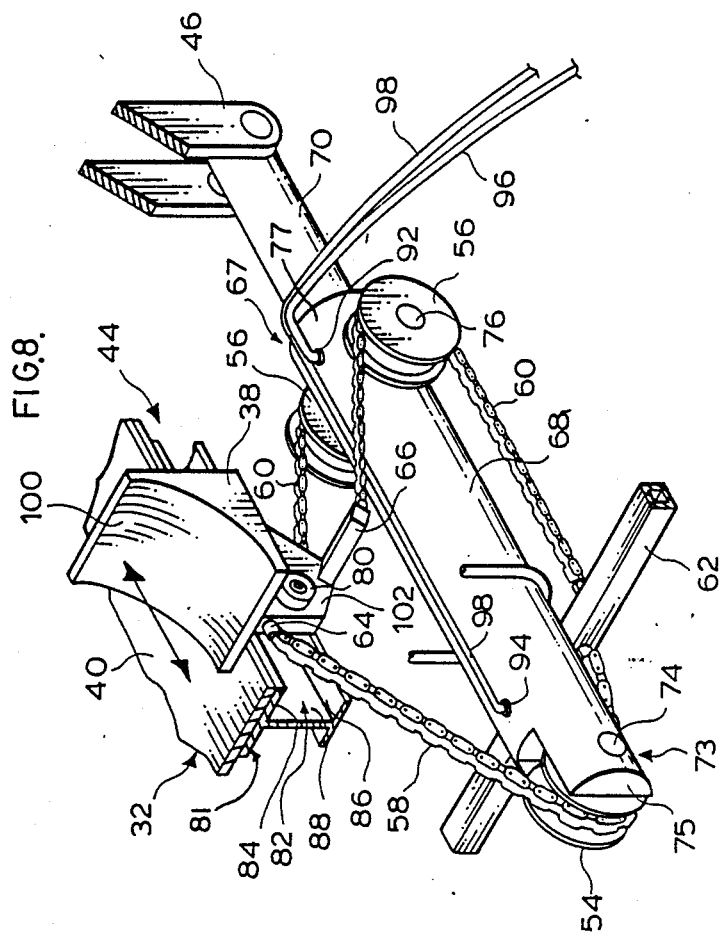

TRUCK SUPPORTING DEVICE

BACKGROUND OF INVENTION (a) Field of the Invention

This invention is concerned with a truck supporting device and a platform assembly particularly for use at a dock for the loading and unloading of trucks; more especially, the truck supporting device has a reciprocatable chock in a guide track, the platform assembly includes a platform on which a truck is supported by the platform assembly at the dock, a guide track with a reciprocatable chock being defined in the platform; in a particular embodiment the platform is hingedly movable about an outer end whereby the level of the floor of a truck or container supported on the platform can be raised or lowered to match that of the dock, whereby the assembly forms a truck levelling device.

(b) Description of Prior Art

Loading and unloading docks typically comprise a generally rectangular opening in a building, the floor of the dock, and usually of the building being above the external ground level.

In use, a truck backs up or reverses towards the dock so that the rear of the truck is in opposition to the dock opening and personnel can readily move back and forth between the truck floor and the dock floor for loading or unloading the truck.

In many cases, the dock floor comprises a dock ramp which can be adjusted in height to accommodate small differences between the height of the truck floor and of the building or dock floor above ground level.

In recent years, truck design has advanced to provide a greater carrying volume. As part of this advance, many modern trucks have a much lower floor than their predecessors; the floor being much closer to ground level. The result of this is that many modern trucks have a truck floor which is significantly below the height of the dock floor, and this presents problems in unloading and loading at the dock.

Truck containers have also been introduced in recent years, and in this case the floor of a container carried by a truck may be above the dock floor.

SUMMARY OF THE INVENTION

It is an object of this invention to provide a truck supporting device having a reciprocatable chock to supportingly engage the truck wheels.

It is another object of this invention to provide such a truck supporting device having a support platform for the truck, the chock being reciprocatable in a guide track in the platform.

It is another object of this invention to provide a platform assembly or truck levelling device which will support a truck and elevate or lower the rear of the thus supported truck to bring the floor of the truck or a container carried by the truck into opposition with the floor of the dock.

It is a further object of this invention to provide such a platform assembly or truck levelling device which will accommodate trucks of various designs having different truck floor or container floor heights above ground level.

It is still another object of this invention to provide such a truck supporting device, platform assembly or truck levelling device in which the truck is securely locked in position, for example on the platform of the assembly or levelling device, by adjustable chocks.

It is yet another object of this invention to provide a mechanism for reciprocating a chock member in a guide track.

In accordance with one aspect of the invention a truck supporting device includes a guide track with inner and outer ends; a drive mechanism reciprocates a chock member along the guide track.

The truck supporting device may particularly include a platform assembly including a support platform having inner and outer ends and an upper support surface, and the guide track is defined in the support surface. The drive mechanism reciprocates the chock member along the platform between the ends.

Suitably, the assembly includes a pair of chock members in side-by-side spaced-apart relationship and a pair of guide tracks in the platform, each chock member being reciprocable along a guide track.

In an especially preferred embodiment, the support platform is hingedly mounted at its outer end and an elevating device particularly a hydraulic cylinder assembly pivots or hingedly moves or turns the platform about its hinge mounting whereby the platform is adjustable from a horizontal configuration to a plurality of configurations inclined to the horizontal in which the inner end is elevated or lowered relative to the outer end, whereby the device forms a truck levelling device.

BRIEF DESCRIPTION OF THE DRAWINGS

The invention is illustrated in an especially preferred embodiment by reference to the accompanying drawings, in which:

FIG. 1 is a schematic side elevation of a truck levelling device in accordance with the invention, supporting a truck at a loading bay;

FIG. 2 is a schematic, partial side elevation similar to FIG. 1, showing operation of the truck levelling device of FIG. 1;

FIG. 3 is a schematic perspective of the truck levelling device of FIG. 1;

FIGS. 4 and 5 are schematic side elevations showing the truck levelling device of FIG. 1 in chock lowered and chock raised configurations respectively;

FIG. 8 shows a detail of the drive mechanism of the dock levelling device of FIG. 1.

DESCRIPTION OF PREFERRED EMBODIMENTS

Figure 6:
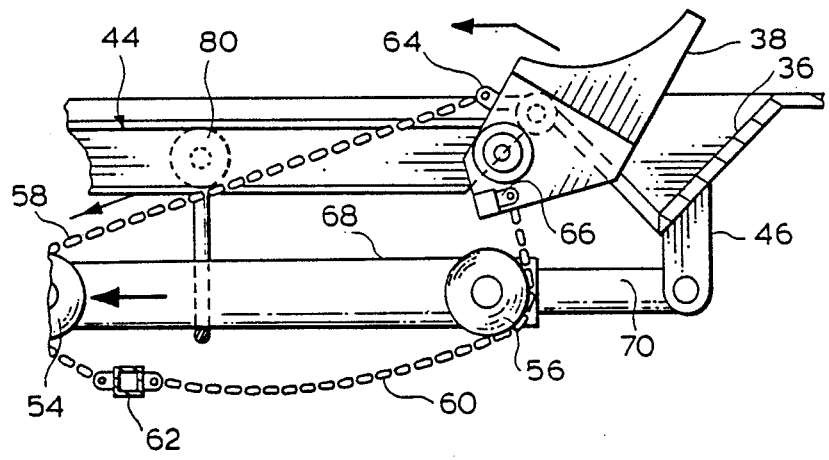
FIG. 6 shows a schematic detail of the truck levelling device of FIG. 1 during raising of the truck.

With further reference to FIG. 1, a truck at a loading dock 12 is supported on a truck leveller 14.

A fork lift truck 16, inside a building (not shown), carries a load 18 from truck 10 after passing over a dock ramp 20.

Truck leveller 14 is housed in a pit 24 having a floor 30.

Truck leveller 14 has a pair of spaced-apart hydraulic cylinders 26 mounted on floor 30 and ramp 20 has a hydraulic ramp cylinder or lift mechanism 28.

Truck leveller 14 includes a platform assembly 31 including a platform 32 having an inner end 33, an outer end 35, and a hinge 34 at outer end 35.

Platform 32 has an upper surface 40 and a lower surface 42. A pair of spaced-apart chock wells 36 extend downwardly from upper surface 42; and hydraulic cylinders 26 are connected at their upper ends to lower surface 42.

With more particular reference to FIGS. 2 and 3, a pair of chocks 38 are pivotable out of the chock wells 36 to project above upper surface 40 and are reciprocable along guide tracks 44 in platform 32, between outer end 35 and inner end 33.

With further reference to FIGS. 4 and 5, truck leveller 14 has a platform assembly 31 which includes a frame 46 having a skirt 48.

A pair of drive assemblies 50 is mounted in platform assembly 31; one drive assembly 50 being mounted below each guide track 44.

Each drive assembly 50 includes a hydraulic cylinder assembly 52, a front sheave 54 and a pair of rear sheaves 56.

A front chain 58, particularly a leaf chain, extends about front sheave 54 between upper chain end 57 and lower chain end 59, and a pair of rear chains 60, particularly leaf chains, extend about rear sheaves 56, between upper chain ends 61 and lower chain ends 63.

A fixed chain mount 62 mounts adjacent lower ends 59 and 63 of the front and rear chains 58 and 60.

A front chock mount 64 mounts upper end 57 of front chain 58 and a rear chock mount 66 mounts upper ends 61 of rear chain 60.

Each hydraulic cylinder assembly 52 has a barrel 68 and a piston rod assembly 67 having a piston 69 (see FIG. 7) and a piston rod 70.

An inner end 72 of piston rod 70 is fixedly mounted in platform assembly 31.

With particular reference to FIG. 8 an outer end 73 of barrel 68 supports a bracket 75 for front sheave 54.

A front shaft 74 extends through bracket 75 and rotatably supports front sheave 54; and a pair of opposed rear shafts 76 extending from an inner end 77 of barrel 68 rotatably support rear sheaves 56.

With particular reference to FIGS. 6 and 8, chock 38 has a pair of chock rollers 80 which roll along opposed side channels 82 of the guide track 44, each channel 82 is formed in an I-beam 81 and has an upper wall 84, a lower wall 86 and a side wall 88. Guide track 44 further includes an elongate slot 90 extending through platform 32.

Hydraulic cylinder assembly 52 has ports 92 and 94 communicating with fluid flow lines 96 and 98 respectively for driving barrel 68 relative to the fixedly mounted piston rod assembly 67.

Chock 38 has a wheel bed 100 and a chock leg 102; chock rollers 80 and chock mounts 64 and 66 are supported on chock leg 102 which extends through slot 90.

Figure 7:
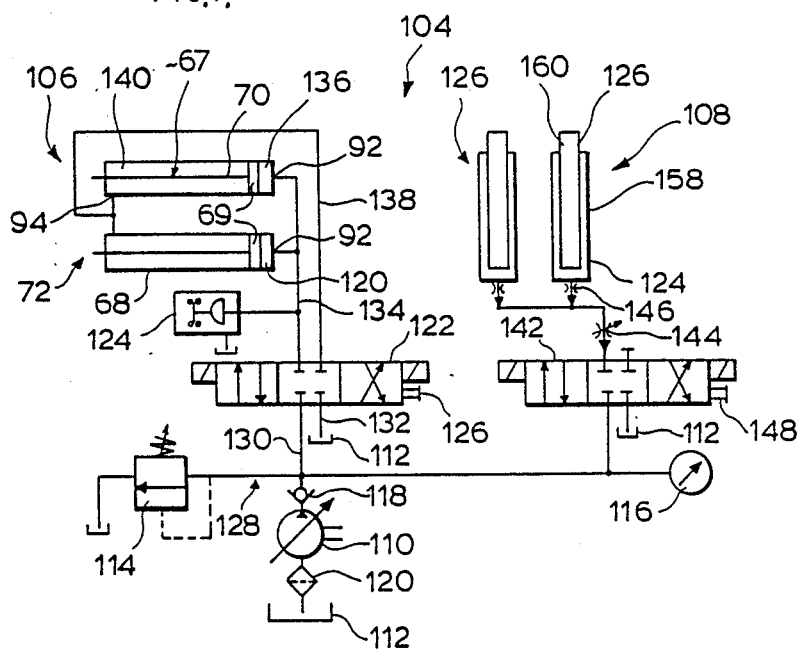
FIG. 7 shows schematically the hydraulic system of a truck levelling device of FIG. 1.

With further reference to FIG. 7 a hydraulic system 104 includes a hydraulic chock drive system 106 and a hydraulic platform levelling system 108.

Hydraulic system 104 includes a pump 110, fluid reservoir 112, pressure relief valve 114, pressure gauge 116, check valve 118 and strainer 120.

Hydraulic chock drive system 106 includes a directional control valve 122 and a pressure switch 124. Valve 122 has a manual control 126.

A flow line system 128 interconnects pump 110, fluid reservoir 108, pressure relief valve 114 and pressure gauge 116. Check valve 118 and strainer are also in flow line system 128.

A flow line 130 connects flow line system and directional control valve 122 and flow line connects the valve 122 with reservoir 112.

Flow line 134 connects directional control valve 122 and port 92 and communicates through port with a barrel chamber 136 adjacent outer end 73; and flow line 138 connects the valve 122 and port 94 and communicates through port 94 with barrel chamber adjacent inner end 77.

Hydraulic platform levelling system 108 includes a directional control valve 142, flow control 144 and velocity fuses 146. Directional control valve 142 has a manual control 148.

A flow line 150 communicates with flow line system 128 and directional control valve 142 and flow line 152 connects valve 142 with reservoir 112.

A flow line 154 communicates directional control valve 142 with hydraulic cylinders 26. Flow control 144 and the velocity fuses 146 are in flow line 154.

In operation, the truck 10 backs up to loading dock 12 and is supported on platform 32 of truck leveller 14. In this initial phase, the chocks are housed in the wells 36 below upper surface 40 and platform 32 is horizontal.

Each hydraulic cylinder assembly 52 is activated whereby hydraulic fluid is pumped by pump via directional control valve 122 through flow line 134 and into barrel chamber 136 to drive barrel from adjacent outer end 35 towards inner end 33. As barrel 68 advances, front chain 58 is drawn around rotating front sheave 54 and rear chains 60 are drawn around rear sheaves 56. In this way, the chocks 38 are pulled out of their respective chock wells 36 and into and along guide tracks 44 wherein chock rollers 80 roll in channels 82.

With the further advance of barrel 68, the length of front chain 58 between front sheave 54 and front chock mount 64 gradually decreases, whereas the length of rear chains 60 between rear sheaves 56 and rear chock mount 66 increases. This is particularly illustrated in FIGS. 4 and 5.

In this way, chocks 38 travel forwardly towards inner end 33 and into engagement with the rear wheels 22 whereby wheels 22 rest in wheel beds 100 as illustrated in FIGS. 1 and 2.

When chocks 38 engage rear wheels 22, a pressure switch 124 switches off pump 110 and the forward travel of chocks 38 ceases. The chocks 38 now securely lock rear wheels 22 of truck 10, and hydraulic cylinders 26 are activated to pivot platform 32 about hinge 34 whereby the inner end 33 is elevated relative to outer end 35. The pivoting is continued until the rear of the truck 10 is at the desired elevation relative to the loading dock 12 for access to the truck interior.

In the activation of hydraulic cylinders 26 by increasing the fluid pressure in hydraulic platform levelling system 108, fluid is pumped by pump 110 to valve 142 through flow line 150 and thence through flow line 154. The system 108 is, of course, under constant hydraulic pressure to support platform assembly 31.

Fine adjustment between the floor of the truck 10 and the floor of the building of the loading dock 12 can be achieved by adjustment of hydraulic ramp cylinder 28 to pivot the outer lip of ramp 20 into engagement with the floor of truck 10.

When loading or unloading of the truck 10 is completed, platform 32 is lowered to its original horizontal configuration by hydraulic cylinders 26, by decreasing the fluid pressure in hydraulic platform levelling system 108, whereafter, the hydraulic cylinder assembly 52 is activated such that pump 110 delivers hydraulic fluid along flow line 138 to barrel chamber 140 to drive each barrel 68 outwardly towards outer end 35, whereby the chocks 38 travel back to and then fall into chock wells 36 so that the truck 10 can drive forwardly off platform 32 away from loading dock 12.

The hydraulic cylinders 26 are in particular displacement cylinders and suitably comprise a rod and cylinder assembly 156, the cylinder 158 being mounted on the floor 30 of pit 24 and reciprocable rod 160 being connected to the lower surface 42 of platform 32 by a pin 162 extending through each rod 160 and mounted in a bracket (not shown) fixed to lower surface 42.

The slots 90 have enlarged inner ends 164 to permit mounting of the chocks 38 in the guide tracks 44.

The velocity fuses 146 are provided at the base of cylinders 158 to prevent collapsing if the fluid lines fail.

When the chocks 38 are in wells 36, an outside green signal light indicates to an approaching truck driver that he is free to back into the loading dock 12, a red inside signal light warns dock personnel that a truck 10 is not securely and safely chocked by chocks 38.

In operation, when the chocks 38 engage the rear wheels 22, the pressure in assembly 52 rises until it trips pressure switch 124 whereafter the pump 110 stops and the inside signal light changes from red to green to indicate that the truck 10 is safely chocked. If pressure is lost in assembly 52, pump 110 starts up automatically to maintain the position of chocks 38.

The outside signal light changes from green to red if either of the chocks 38 are out of their wells 36.

While the invention has been described in the particular embodiment by reference to the drive assembly 50 based on chains 58 and 60 and sheaves 54 and 56, it will be understood that other drive assemblies can be employed, for example employing cables or straps rather than chains, or a worm screw.

While the invention has been described in the specific embodiment with reference to the drawings for the case in which the platform 32 is to be elevated to align the floor of truck 10 with the floor of the loading bay 12, it will be understood that essentially the same procedure is followed for lowering the platform below the horizontal for the case in which the truck floor or the floor of a container carried by the truck is initially above the level of the floor of the loading bay 12. In this case pressure in system 108 is reduced to lower the platform 32 supported by hydraulic cylinders 26.

The skirt 48 of platform assembly 31 is a safety feature defining a toe guard between platform 32 and pit 30.

The manual controls 126 and 148 likewise provide a safety feature in the event of power failure, whereby the chocks 38 and platform 32 can be manually adjusted.

We claim:

1. In combination, a loading dock having a vertical dock face and a vehicle supporting surface extending outwardly from said dock face, vehicle locking means mounted on said supporting surface for locking a vehicle against outward movement away from said dock face and including guide track means, wheel chock means mounted for movement on said guide track means between a storage position where said wheel chock means will not obstruct movement of a vehicle on said supporting surface, and an operative position where said wheel chock means extends upwardly above said supporting surface and is disposed to engage a wheel of a vehicle to prevent movement of said vehicle away from said dock face, and drive means operably connected to said wheel chock means for moving said wheel chock means between the storage and operative positions, said drive means comprising a fluid cylinder unit including a cylinder member and a piston member, said members being mounted for movement relative to each other, a first of said members being fixed relative to said guide track means and a second of said members being operably connected to said wheel chock means, said fluid cylinder unit being constructed and arranged such that movement of said second member relative to said first member will move said wheel chock means between the storage and operative positions.

2. The combination of claim 1, wherein said fluid cylinder unit is mounted beneath the level of said supporting surface.

3. The combination of claim 1, and including pivot means for pivotally mounting said wheel chock means relative to said guide track means.

4. The combination of claim 3, and said drive means includes a flexible drive member being disposed in a loop configuration and connected to said wheel chock means, a portion of said flexible drive member being fixed to said guide track means, said second member being operably connected to said flexible drive member.

5. The combination of claim 4, wherein the connection of said flexible drive member to said wheel chock means is spaced from the axis of said pivot means.

6. The combination of claim 4, wherein said flexible drive member comprises a chain.

7. The combination of claim 1, wherein said first member comprises said piston member and said second member comprises said cylinder member.

8. The combination of claim 4, and including first and second support elements mounted on said second member for supporting said flexible drive member in movement.

9. In combination, a loading dock having a vertical dock face and a vehicle supporting surface extending outwardly from said dock face, vehicle locking means mounted on said supporting surface for locking a vehicle against outward movement away from said dock face and including guide track means, wheel chock means mounted for movement on said guide track means between a storage position where said wheel chock means will not obstruct movement of a vehicle on said supporting surface, and an operative position where said wheel chock means extends upwardly above said supporting surface and is disposed to engage a wheel of a vehicle to prevent movement of said vehicle away from said dock face, and drive means operably connected to said wheel chock means for moving said wheel chock means between the storage and operative positions, said drive means including a flexible drive member disposed in a generally endless configuration and attached to said wheel chock means, connecting means for connecting a portion of said flexible drive member to a fixed location, said drive means also including a fluid cylinder unit operably connected to said flexible drive member at a location spaced between said connecting means and the attachment of said drive member to said wheel chock means, said fluid cylinder unit being constructed and arranged such that operation of said cylinder unit will move said wheel chock means between the storage and operative positions.

10. In combination, a loading dock having a vertical dock face and a driveway extending outwardly from said dock face, said driveway having a recess therein, support means for supporting a vehicle and disposed in said recess, mounting means for mounting the support means for vertical movement in said recess, operating means for moving said support means vertically in said recess, guide track means in said support means, wheel chock means mounted for movement on said guide track means between a storage position where said wheel chock means will not obstruct movement of a vehicle across said support means and an operative position where said wheel chock means extends upwardly above said support means and is disposed to engage a wheel of a vehicle located on said support means, and drive means operably connected to said wheel chock means for moving the wheel chock means between the storage and operative position, said drive means including a first fluid cylinder unit comprising a cylinder member and a piston member, said members being mounted for movement relative to each other, a first of said members being connected to said support means and a second of said members being operably connected to said wheel chock means, said members being constructed and arranged such that relative movement of said members will move said wheel chock means between the storage and operative positions.

11. The combination of claim 10, wherein said mounting means comprises pivot means for mounting said support means for pivotal movement in a vertical plane.

12. The combination of claim 11, wherein said pivot means is disposed at the end of said support means facing away from said dock face.

13. The combination of claim 10, wherein said operating means comprises a second fluid cylinder unit interconnecting said driveway and said support means.

14. The combination of claim 10, wherein said first fluid cylinder unit is carried by said support means.

15. The combination of claim 10, wherein said support means is provided with a recess to receive said wheel chock means when in said storage position, said guide track means extending from said recess toward said dock face.

16. In combination, a loading dock having a vertical dock face and a vehicle supporting surface extending outwardly from said dock face, vehicle locking means mounted on said supporting surface for locking the vehicle against outward movement from said dock face, guide track means carried by said supporting surface and extending longitudinally outward from said dock face, wheel chock means mounted for movement on said guide track means from a storage position where said wheel chock means will not obstruct movement of a vehicle on said supporting surface to an operative position where said wheel chock means extends upwardly from said supporting surface and is disposed to engage a wheel of the vehicle, flexible drive means including a first section and a second section, one end of said first section being connected to said wheel chock means and extending from said wheel chock means in a first direction toward said dock face and the opposite end of said first section being fixed, one end of said second section being connected to said wheel chock means and extending from said wheel chock means in a second direction away from said dock face and the opposite end of said second section being fixed, first support means for supporting said first section in movement, second support means for supporting said second section in movement, and drive means operably connected to said first and second support means for moving said first and second support means in unison to move said flexible drive means and thereby move said wheel chock means between said storage and operative positions.

* * * * *